3,209,006
**PHENYLPIPERIDINE AND PHENYLTETRA-
HYDROPYRIDINE COMPOUNDS**
William Robert Wragg, Woodford Green, Anthony Stanley Fenton Ash, Epping, and Andrew Malcolm Creighton, London, England, assignors to May & Baker Limited, Dagenham, England, a British company
No Drawing. Filed Aug. 21, 1961, Ser. No. 132,551
Claims priority, application Great Britain, May 1, 1959, 150,048/59; July 28, 1961, 27,563/61, 27,564/61
12 Claims. (Cl. 260—293)

This application relates to heterocyclic compounds and has for an object the provision of new and useful compounds of therapeutic value. It further relates to the production of said compounds and to pharmaceutical compositions containing them. It is a continuation-in-part of application Serial No. 25,199, filed on April 28, 1960, and now abandoned.

According to the present invention there are provided new and useful phenylpiperidine and phenyltetrahydropyridine compounds of the general formula:

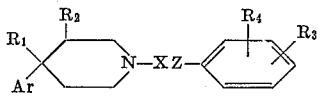
I and their acid addition salts, wherein X represents a straight, saturated or straight, mono-ethylenically unsaturated hydrocarbon chain of one of three carbon atoms, Z represents a $$-CH_2-, =CH-, -CO- \text{ or } -CH- \\ \phantom{-CH_2-, =CH-, -CO- \text{ or } -}|\\ \phantom{-CH_2-, =CH-, -CO- \text{ or } -}OH$$

group, Ar represents a phenyl group substituted in meta position by a substituent selected from chlorine, bromine and fluorine atoms and trifluoromethyl groups, $R_1$ and $R_2$ when taken separately represent hydrogen atoms or when taken together represent a single bond, $R_3$ is in one of the positions meta and para and is selected from hydrogen, amino, mono-alkylamino, dialkylamino, monohydroxyalkylamino, di(hydroxyalkyl)amino, lower aliphatic acyloxyalkylamino, lower aliphatic acylamido (including lower akane sulphonamido), N-lower alkyl aliphatic acylamido, nitro, carbamoylamino, and alkoxycarbonylamino groups, and $R_4$ is in one of the positions meta and para and is hydrogen or an amino group. By the terms "lower," "alkyl," "alkoxy" and "hydroxyalkyl" as used throughout this specification and accompanying claims is meant alkyl, alkoxy, hydroxyalkyl and other groups containing up to 4 carbon atoms.

The aforesaid compounds possess pharmacological properties which render them useful as antihistaminics, hypothermic agents and potentiators of general anaesthetics (e.g. hexobarbitone and ether), and they are also useful in veterinary medicine. The pharmacological and psychotropic properties of these compounds also render them of utility in the treatment of psychiatric disorders. These properties are evidenced by the production of an increase in the psychomotor activity of rats and dogs and the ability of the compounds to reverse the action of reserpine in rabbits. The compounds of this invention which combine most advantageously the aforesaid pharmacological and psychotropic properties are those in which XZ is a —$CH_2$—$CH_2$— or —$CH_2$—$CH(OH)$— grouping, Ar is a phenyl group substituted by a chlorine or trifluoromethyl group, $R_3$ is a group in the para position selected from hydrogen, amino, monohydroxyalkyl-amino, lower aliphatic acylamido (including lower alkanesulphonamido), carbamoylamino and mono-acetoxyethylamino groups and $R_4$ is a hydrogen atom, and their acid addition salts. Of outstanding importance is 1-2'-(p-aminophenyl)ethyl-4-m-trifluoromethylphenyl-1,2,3,6-tetrahydropyridine which, together with its acid addition salts, has been shown to produce a useful increase in the psychomotor activity of depressed patients.

According to a feature of the invention, the compounds of general Formula I are prepared by reacting a piperidine or tetrahydropyridine derivative of the general formula:

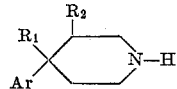
II (wherein Ar, $R_1$ and $R_2$ are as hereinbefore defined) with a compound of the general formula:

$$Y—X_1Z—P \qquad\qquad III$$

(wherein Y represents the acid residue of a reactive ester, such as a halogen atom or a sulphuric or sulphonic ester residue, $X_1$ represents the group X as hereinbefore defined or a similar group wherein one of the methylene groups is replaced by a carbonyl group, Z is as hereinbefore defined, and P represents the grouping:

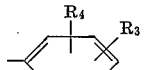
IV wherein $R_3$ and $R_4$ are as hereinbefore defined, or a group convertible thereto) followed, where necessary, by reduction of the group $X_1$ to the desired group X by known methods for the reduction of a carbonyl group to methylene, e.g. by lithium aluminium hydride, and conversion of the group P to the desired grouping of Formula IV. The grouping P as a group convertible into the grouping of Formula IV may be, for example, a p-nitrophenyl group. After the reaction, the nitro group in the resultant product may be reduced to an amino group, e.g. by catalytic hydrogenation using hydrogen and a hydrogenation catalyst such as Raney nickel or by chemical means such as iron and hydrochloric acid, and the free amino group converted into an alkylamino, dialkylamino, hydroxyalkylamino, di(hydroxyalkyl)amino, acylamido, acylalkylamido, carbamoylamino or alkoxycarbonylamino group in manner shown per se.

The condensation reaction is preferably effected by heating the reactants in an inert solvent such as an alcohol (e.g. ethanol), a ketone (e.g. acetone), a benzene hydrocarbon or a halogenated hydrocarbon, in the presence of an acid-binding agent, e.g. an alkali metal or derivative thereof such as an alkali metal carbonate, alkoxide, amide or hydride, or a tertiary base such as quinoline. The acid-binding agent is conveniently an excess of the piperidine or tetrahydropyridine derivative starting material of Formula II.

The tetrahydropyridine derivatives of Formula II used as starting materials where $R_1$ and $R_2$ represent a single bond may be prepared by known methods (see, for example, Schmidle and Mansfield, J. Amer. Chem. Soc., 1956, 78, 425), or by treating a m-substituted phenyl magnesium bromide, e.g. m-trifluoromethylphenyl magnesium bromide, or a m-substituted phenyl lithium, e.g. trifluoromethylphenyl lithium, with 1-benzylpiperid-4-one followed by debenzylation and dehydration of the resultant 1-benzyl-4-hydroxy-4-m-substituted phenylpiperidine, e.g. 1-benzyl-4-hydroxy-4-m-trifluoromethylphenylpiperidine.

According to a further feature of the invention, the compounds of general Formula I in which $R_1$ and $R_2$ together represent a single bond may be prepared from a compound of the formula:

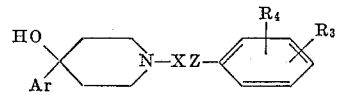
V (wherein the various symbols are as hereinbefore defined) by heating with a mineral acid excluding nitric acid, for example, hydrochloric or phosphoric acid. The intermediates of general Formula V may be conveniently prepared by the condensation of a 4-hydroxypiperidine of the formula:

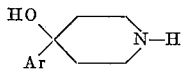
VI (wherein Ar is as hereinbefore defined) with a compound of general Formula III and following the subsequent reaction steps as set out above for the preparation of the compounds of general Formula I.

It is within the scope of the invention to prepare a compound of Formula I from another compound of Formula I. Thus, compounds in which $R_3$ is an alkylamino or dialkylamino group and in which $R_1$ and $R_2$ are hydrogen can be prepared by reductive alkylation of the corresponding primary amines, e.g. hydrogenation in the presence of formaldehyde and a suitable catalyst. The compounds in which $R_3$ is an acylamido substituent can be prepared from the corresponding primary amines by known methods of acylation, such as acetylation using acetic anhydride or formylation using formic acid. Acylamido substituents can be converted into an amino substituent by hydrolysis according to known methods for hydrolysing amides, or into alkylamino substituents by reduction, for example, with lithium aluminium hydride. Compounds in which $R_3$ is a mono-hydroxyalkylamino group can be prepared by reacting corresponding primary amino compounds with, for example, chloroethyl chloroformate followed by alkaline hydrolysis, or with an alkylene oxide such as ethylene oxide. A primary amino group can be converted to alkoxycarbonylamino by reaction with an alkyl chloroformate. Compounds in which $R_3$ is a di(hydroxyalkyl)amino or a carbamoylamino group can be prepared from compounds in which $R_3$ is a primary amino group by reaction with an alkylene oxide or a cyanate respectively. Compounds in which $R_1$ and $R_2$ are hydrogen atoms can be prepared from corresponding tetrahydropyridine compounds, i.e. $R_1$ and $R_2$ together represent a single bond, by known methods for the reduction of a tetrahydropyridyl nucleus to a piperidyl nucleus, e.g. by catalytic hydrogenation. The expression "known methods" used herein means methods heretofore used or described in the chemical literature.

Exemplary methods of carrying out conversions of these kinds are given in the examples which follow.

When the compounds of general Formula I are used for therapeutic purposes in the form of acid addition salts, it should be understood that only those such salts should in practice be employed as contain anions or radicals that are relatively inocuous to the organism when used in therapeutic doses so that the beneficial physiological properties inherent in the parent compound are not vitiated by side-effects ascribable to those anions or radicals; in other words, only non-toxic salts are contemplated. Suitable acid addition salts include hydrohalides (for example hydrochlorides), phosphates, nitrates, sulphates, maleates, fumarates, citrates, tartrates, isethionates, methane sulphonates and ethane disulphonates. These salts may be made from the bases of general Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

The following examples will serve to illustrate the invention:

*Example I*

A solution of m-trifluoromethylbromobenzene (59.5 g.) in dry ether (100 cc.) was added to a stirred suspension of magnesium (6.5 g.), and a crystal of iodine, in ether (250 cc.) at a rate which maintained reflux. The suspension was stirred for 1 hour after the addition and a solution of 1-benzyl-piperid-4-one (50 g.) in dry ether was added rapidly. After standing overnight, the mixture was ice-cooled and ice (9 g.), 50% aqueous sodium hydroxide (21 cc.) and water (10 cc.) added successively with stirring. The suspension was filtered and the residue extracted with chloroform. The ether layer was separated from the filtrate, combined with the chloroform extract and shaken with 2 N acetic acid. The acid layer was made alkaline with sodium hydroxide, extracted with chloroform, and then dried with ($MgSO_4$) chloroform solution evaporated leaving a brown oil (71.2 g.). Trituration of the oil with 2 N hydrochloric acid (200 cc.) and water (100 cc.) gave a crude hydrochloride (68.7 g.) which was recrystallised from ethanol, ether and hydrochloric acid to give 1-benzyl-4-m-trifluoromethylphenyl-4-hydroxypiperidine hydrochloride, M.P. 244–246° C., in 41% yield (40.5 g.).

Hydrogenation of 1-benzyl-4-m-trifluoromethylphenyl-4-hydroxypiperidine hydrochloride (10 g.) in ethanol (200 cc.) at 71° C. and 70 p.s.i., in the presence of a palladium-on-carbon catalyst, gave 4-m-trifluoromethylphenyl-4-hydroxypiperidine hydrochloride, M.P. 174–5° C., in 73% yield (5.5 g.).

4-m-trifluoromethylphenyl-4-hydroxypiperidine hydrochloride (5.1 g.) and concentrated hydrochloric acid (5.4 cc.) were heated for 6 hours on the steam bath. The crystalline material which separated from the solution on cooling was collected and recrystallised from isopropanol (20 cc.) and ether (20 cc.) to give 4-m-trifluoromethylphenyl - 1,2,3,6-tetrahydropyridine hydrochloride, M.P. 209–211° C., in 83% yield (3.9 g.).

A suspension of 4 - m - trifluoromethylphenyl-1,2,3,6-tetrahydropyridine hydrochloride (3.5 g.), p-nitrophenylethylbromide (3.06 g.) and anhydrous sodium carbonate (4.25 g.) in dry ethanol (35 cc.) was refluxed and stirred in an atmosphere of nitrogen for 18 hours. The reaction mixture was filtered hot and the filtrate evaporated leaving an oil which solidified. Recrystallisation from aqueous methanol and then from light petroleum (B.P. 60–80° C.) gave 1 - 2' - (p-nitrophenyl)ethyl-4-m-trifluoromethylphenyl - 1,2,3,6-tetrahydropyridine (M.P. 85–87° C., yield 78%). Similarly prepared was 1-2'-(p-nitrophenyl)ethyl - 4 - m-chlorophenyl-1,2,3,6-tetrahydropyridine (M.P. 99–101° C., yield 83%).

Reduction of 1-2'-(p-nitrophenyl)ethyl-4-m-trifluoromethylphenyl - 1,2,3,6-tetrahydropyridine hydrochloride (3.4 g.) in ethanol (25 cc.) and water (25 cc.) by refluxing for 5 hours with iron (1.6 g. reduced powder) and 2 N hydrochloric acid (9 cc.), gave 1-2'-(p-aminophenyl)ethyl - 4-m-trifluoromethylphenyl-1,2,3,6-tetrahydropyridine, M.P. 93–95° C. The yield was 74% (2.3 g.) after recrystallisation from cyclohexane.

Similarly prepared was 1-2'-(p-aminophenyl)ethyl-4-m-chlorophenyl-1,2,3,6-tetrahydropyridine, M.P. 88–89° C. (yield 59%).

*Example II*

4-m-trifluoromethylphenyl -4-hydroxypiperidine hydrochloride (14 g.), p-nitrophenylethyl bromide (11.5 g.) and anhydrous sodium carbonate (16 g.) in dry ethanol (200 cc.) were refluxed and stirred in an atmosphere of nitrogen for 18 hours. The reaction mixture was filtered hot and the filtrate evaporated to dryness. The crude product thus obtained was recrystallised twice from aqueous methanol to give 1-2'-(p-nitrophenyl)ethyl-4-m-trifluoromethylphenyl-4-hydroxy-piperidine (15.5 g., 79%, M.P. 114–116° C.).

1 - 2' - (p-nitrophenyl)ethyl-4-m-trifluoromethylphenyl-4-hydroxypiperidine (14.9 g.) in ethanol (250 cc.) was hydrogenated at 24° C. and 70 p.s.i. over a Raney nickel catalyst. Recrystallisation of the crude product from aqueous isopropanol gave 1-2'-(p-aminophenyl)ethyl-4-m-trifluoromethylphenyl-4-hydroxypiperidine, M.P. 111–113° C., in 79% yield (10.8 g.).

1 - 2' - (p-aminophenyl)ethyl-4-m-trifluoromethylphenyl-4-hydroxypiperidine (0.5 g.) in concentrated hydrochloric acid (5 cc.) was heated for 6 hours on the steam bath. After cooling the suspension was made alkaline with dilute ammonium hydroxide and shaken with chloroform. The chloroform layer was separated, washed with water, dried with (MgSO₄) and evaporated leaving a pale yellow oil which solidified. Recrystallisation from cyclohexane (10 cc.) gave 1-2'-(p-aminophenyl)ethyl-4-m-trifluoromethylphenyl-1,2,3,6-tetrahydropyridine, M.P. 93–95° C., in 63% yield (0.3 g.).

*Example III*

1 - 2' - (p - aminophenyl)ethyl - 4 - m - trifluoromethylphenyl - 1,2,3,6-tetrahydropyridine (8.0 g.) (prepared as described in Example I), formic acid (98–100%, 3.2 g.) and dry toluene (80 cc.) were refluxed together, under a Dean and Stark separator, for 8 hours. After evaporation to dryness the residue was taken up in chloroform, shaken with ice-cold N sodium hydroxide, and separated. The dried with (MgSO₄) chloroform solution was evaporated and the residue dissolved in hot benzene (60 cc.). The crude product, obtained by addition of cyclohexane (60 cc.), was collected and recrystallised from benzene/cyclohexane to give 1-2'-(p-formamidophenyl)ethyl-4-m-trifluoromethylphenyl - 1,2,3,6 - tetrahydropyridine, M.P. 142–144° C., in 69% yield.

*Example IV*

4 - m - trifluoromethylphenyl - 1,2,3,6 - tetrahydropyridine (7.0 g.), p-acetamidophenylethyl bromide (7.4 g.), anhydrous triethylamine (4.0 g.) and benzene (120 cc.) were refluxed together in an atmosphere of nitrogen for 20 hours. After evaporation to dryness the residue was shaken with chloroform (150 cc.) and ice-cold 0.5 N sodium hydroxide (80 cc.). The dried with (MgSO₄) chloroform solution was evaporated and the residue dissolved in n-propanol. Addition of methane sulphonic acid (2.2 cc.) and ether gave a salt which was collected and recrystallised from n-propanol and ether to give 1-2'-(p-acetamidophenyl)ethyl - 4 - m - trifluoromethylphenyl-1,2,3,6-tetrahydropyridine methane sulphonate (10.9 g., 73%), M.P. 219–221° C.

Similarly prepared was 1-2'-(p-methanesulphonamidophenyl)ethyl - 4 - m - trifluoromethylphenyl - 1,2,3,6 - tetrahydropyridine (M.P. 136–139° C., yield 42%) and 1-(4-p-acetamidophenyl - 4 - oxobutyl - 4 - m - trifluoromethylphenyl - 1,2,3,6 - tetrahydropyridine (M.P. 128–130° C., yield 20%). The starting materials for these two compounds, 2 - p - methanesulphonamidophenylethyl bromide and 4 - chloro - p - acetamidobutyrophenone respectively, were prepared as follows:

A solution of methanesulphonyl chloride (3.4 ml.) in dry chloroform (15 ml.) was added dropwise during ten minutes at room temperature to a stirred solution of the free base from 2-p-aminophenylethyl bromide hydrochloride (19.3 g.) in dry chloroform (120 ml.). When the addition was complete, the reaction mixture was stirred at room temperature for twenty minutes, then boiled under reflux for twenty minutes, cooled and filtered. The filtrate was evaporated to dryness, the solid residue dissolved in benzene (200 ml.) and this solution extracted with water (3 x 200 ml.). The benzene solution was then dried (with MgSO₄) and evaporated to give a solid residue which on recrystallisation from ethanol-light petroleum (B.P. 68–80° C.) afforded 2 - p - methanesulphonamidophenylethyl bromide as pale pink microcrystalline plates (5.8 g., 51%), M.P. 104–105° C.

4-chlorobutyryl chloride (140 g.) was added slowly during thirty minutes at room temperature to a stirred mixture of acetanilide (50 g.), aluminium chloride (250 g.) and carbon disulphide (105 cc.). When the addition was complete, the reaction mixture was heated under reflux on a warm water bath (50–70° C.) for ninety minutes and then evaporated under reduced pressure. The residual oil was poured slowly, with vigorous stirring into ice/water (4 kg.) and the solid product collected by filtration and dissolved in isobutyl methyl ketone (1 litre). The ketonic solution was washed with water, dried (with MgSO₄) and evaporated under reduced pressure to give a solid residue which, on recrystallisation from a mixture of ethyl acetate (500 cc.) and ethyl methyl ketone (200 cc.) afforded 4-chloro-p-acetamidobutyrophenone (48 g., 54%), M.P. 162–164° C.

*Example V*

1 - 2' - (p - aminophenyl)ethyl - 4 - m - trifluoromethylphenyl-1,2,3,6-tetrahydropyridine (10 g., prepared as described in Example I) in dry chloroform (50 cc.) was added dropwise over 30 minutes to a stirred solution of 2-chloroethyl-chloroformate (4.4 g.) in dry chloroform (50 cc.) at room temperature. The mixture was refluxed for 30 minutes, cooled, and 1-2'-(p-N-2-chloroethoxy-carbonylaminophenyl)ethyl - 4 - m - trifluoromethylphenyl-1,2,3,6-tetrahydropyridine hydrochloride (13.4 g., 95%) was collected as a pale yellow solid. Refluxing this product with potassium hydroxide (9 g.) in ethanol (60 cc.) for 2½ hours gave 1-2'-(p-N-2-hydroxyethylaminophenyl)ethyl - 4 - m - trifluoromethylphenyl - 1,2,3,6 - tetrahydropyridine, M.P. 103–105° C. after recrystallisation from cyclohexane (yield 9.2 g., 88%).

*Example VI*

A solution of p-nitrostyrene bromhydrin (14.1 g.) in dry toluene (210 cc.) was added over 2 hours to a refluxing solution of 4-m-trifluoromethylphenyl-1,2,3,6-tetrahydropyridine (26 g.) in toluene (105 cc.). After refluxing for a further 18 hours the cooled suspension was filtered and the filtrate evaporated to a viscous oil which crystallised from methanol to give DL-1-2'-(p-nitrophenyl)-2'-hydroxyethyl - 4 m - trifluoromethylphenyl - 1,2,3,6 - tetrahydropyridine (6.5 g., 29%), M.P. 122–124° C.

Reduction of DL-1-2'-(p-nitrophenyl)-2'-hydroxyethyl-4 - m - trifluoromethylphenyl - 1,2,3,6 - tetrahydropyridine (4.2 g.) in ethanol (60 cc.) with hydrazine hydrate (100%, 1.7 cc.), in the presence of Raney nickel, gave DL - 1 - 2' - (p - aminophenyl) - 2' - hydroxyethyl - 4 - m-trifluoromethylphenyl - 1,2,3,6 - tetrahydropyridine (3.4 g., 87%), M.P. 129–131° C. after recrystallisation from aqueous methanol.

*Example VII*

1 - 2' - (p - aminophenyl)ethyl - 4 - m - trifluoromethylphenylpiperidine (5.0 g.) (prepared as described in Example XI) in ethanol (50 cc.) and 40% w./v. aqueous formaldehyde solution (320 cc.) was hydrogenated at 25° C. and 550 lbs. per sq. in. pressure over Raney nickel catalyst. When hydrogen uptake ceased the resulting suspension was filtered through "Hyflo Supercel" and excess concentrated hydrochloric acid added to the filtrate. The solution so obtained was evaporated to dryness and the residue recrystallised from isopropanol and ether to give 1 - 2' - (p - dimethylamino - phenyl)ethyl - 4 - m - trifluoromethylphenylpiperidine dihydrochloride (4.8 g.; 75%), M.P. 263–267° C. (decomp.).

*Example VIII*

A solution of 1-2'-(p-aminophenyl)ethyl-4-m-trifluoromethylphenyl-1,2,3,6-tetrahydropyridine (1.3 g.) (prepared as described in Example I) in 2 N hydrochloric acid (3.8 cc.) and water (40 cc.) was cooled to 10° C. and a solution of sodium cyanate (0.26 g.) in water (5 cc.) added drop-wise over 10 minutes at 10–15° C. The solid which separated during 2 hours stirring at room temperature was collected and recrystallised, first from aqueous isopropanol and then from ethanol, to give 1-2'-(p-ureidophenyl)ethyl - 4 - m - trifluoromethylphenyl - 1,2,3,6-tetrahydropyridine (0.3 g., 16%), M.P. 219–221° C.

*Example IX*

4 - m - trifluoromethylphenyl - 1,2,3,6 - tetrahydropyridine (10 g.), β-phenylethyl bromide (7.05 g.) and anhydrous sodium carbonate (12 g.) in dry ethanol (70 cc.) were refluxed together for 16 hours in an atmosphere of nitrogen. The reaction mixture was filtered hot and the filtrate evaporated leaving an oil which solidified. Addition of ethereal hydrogen chloride to a solution of the solid in isopropanol gave 1-2'-phenylethyl-4-m-trifluoromethylphenyl - 1,2,3,6 - tetrahydropyridine hydrochloride (8.5 g., 61%), M.P. 228–229° C. The methanesulphonate had M.P. 138–140° C.

*Example X*

4 - m - trifluoromethylphenyl - 1,2,3,6 - tetrahydropyridine (8.0 g.) and p - nitrophenylbutadiene (6.3 g.) were refluxed in n-propanol for 6 hours in an atmosphere of nitrogen. The reaction mixture was filtered hot and evaporated to a viscous oil. Addition of ethereal hydrogen chloride to a solution of the oil in ether gave 1-(4-p-nitrophenylbut - 2 - enyl) - 4 - m - trifluoromethylphenyl - 1,2,3,6 - tetrahydropyridine, (3.9 g., 28%), M.P. 180–182° C. after recrystallisation from isopropanol and ether.

1 - (4 - p - nitrophenylbut - 2 - enyl) - 4 - m - trifluoromethylphenyl - 1,2,3,6 - tetrahydropyridine (2.3 g.) was warmed for 1 hour at 40–50° C. in ethanol (30 cc.) with hydrazine hydrate (100%, 1.5 cc.) in the presence of Raney nickel. After boiling for a few minutes with excess Raney nickel, to destroy residual hydrazine, the suspension was filtered hot through "Hyflo Supercel." Evaporation of the filtrate left an oil to which ethereal hydrogen chloride was added. The precipitated salt was collected, boiled with acetone, and recrystallised from ethanol and ether to give 1 - (4 - p - aminophenylbut - 2 - enyl)- 4 - m - trifluoromethylphenyl - 1,2,3,6 - tetrahydropyridine dihydrochloride (0.4 g., 16%), M.P. 243–246° C.

*Example XI*

1 - 2' - (p - nitrophenyl)ethyl - 4 - m - trifluoromethylphenyl-1,2,3,6-tetrahydropyridine (14.3 g.) (prepared as described in Example I) in ethanol (150 cc.) was hydrogenated at 67° C. and 400 p.s.i. over Raney nickel catalyst. When hydrogen uptake ceased the suspension was filtered through "Hyflo Supercel" and excess concentrated hydrochloric acid added to the filtrate. The solution was evaporated to dryness and the residue crystallised from isopropanol and ether to give 1-2'-(p-aminophenyl)ethyl - 4 - m - trifluoromethylphenylpiperidine dihydrochloride, M.P. 250–255° C., (11.8 g., 81%).

*Example XII*

Boron trifluoride etherate (6.8 g.) was added drop-wise over 30 minutes to a solution of 1-2'-(p-N-2-hydroxyethylaminophenyl)ethyl - 4 - m - trifluoromethylphenyl-1,2,3,6-tetrahydropyridine (3.5 g.) (prepared as described in Example V) in glacial acetic acid at room temperature. The solution was then heated for 2 hours at 65–70° C., cooled, poured onto ice water (50 cc.) and made alkaline at 0° C. with ammonium hydroxide solution (S.G.=0.88). The product was extracted with chloroform and the dried (with MgSO$_4$) chloroform solution evaporated to leave a residual oil. Addition of ethereal hydrogen chloride to a solution of the oil in ethanol gave 1-2'-(p-N-2-acetoxyethylaminophenyl)ethyl - 4 - m - trifluoromethylphenyl-1,2,3,6-tetrahydropyridine dihydrochloride (3.4 g., 75%), M.P. 189–191° C. after recrystallisation first from methanol and ether, and finally from ethanol.

*Example XIII*

4 - m - trifluoromethylphenyl - 1,2,3,6 - tetrahydropyridine (8.5 g.), 4-acetamido-3-nitrophenylethyl bromide (9.3 g.) and anhydrous triethylamine (8.2 g.) were refluxed together in dry benzene (150 cc.), in an atmosphere of nitrogen, for 17 hours. The suspension was evaporated to dryness and the residue partitioned between chloroform (200 cc.) and 2 N ammonium hydroxide (100 cc.). Then dried with (MgSO$_4$) chloroform solution was evaporated and the residue crystallised from aqueous methanol to give 1-2'-(3-nitro-4-acetamidophenyl)ethyl - 4 - m - trifluoromethylphenyl - 1,2,3,6-tetrahydropyridine, M.P. 112–114° C. (7.2 g., 52%).

1 - 2' - (3 - nitro - 4 - acetamidophenyl)ethyl - 4 - m - trifluoromethylphenyl-1,2,3,6-tetrahydropyridine (1.1 g.) was warmed for 1 hour at 40–50° C. in ethanol (10 cc.) with hydrazine hydrate (100%, 1 cc.) in the presence of Raney nickel. After boiling for a few minutes with excess Raney nickel the suspension was filtered hot through "Hyflo Supercel" and evaporated to dryness. The resultant solid was crystallised from aqueous methanol to give 1 - 2' - (3 - amino - 4 - acetamidophenyl) - ethyl- 4 - m - trifluoromethylphenyl - 1,2,3,6-tetrahydropyridine, M.P. 157–159° C., (0.8 g., 79%).

The present invention further includes within its scope pharmaceutical compositions which comprise one or more compounds of general Formula I or their acid addition salts as aforesaid together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents. The compositions according to the invention for oral administration also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substances in the case of oral preparations.

The following example illustrates pharmaceutical compositions according to the invention:

*Example XIV*

Tablets of the formula:

| | Mg. |
|---|---|
| 1 - 2' - (p - aminophenyl)ethyl - 4 - m - trifluoromethylphenyl - 1,2,3,6 - tetrahydropyridine hydrochloride | 10 |
| Lactose | 49.5 |
| Starch | 20 |
| Dextrin | 20 |
| Magnesium stearate | 0.5 | were prepared by intimately mixing the tetrahydropyridine derivative, lactose, starch and dextrin and passing the mixture through a 60 mesh sieve. After addition of the magnesium stearate, the mixture is granulated to a suitable size and the granules compressed to form tablets.

Instead of the tetrahydropyridine derivative specified in the above formulation any other compound within the terms of general Formula I may be employed, e.g. any of those set forth in the foregoing Examples II to XIII.

We claim:

1. A member selected from the group consisting of the phenylpiperidine and phenyltetrahydropyridine compounds of the formula:

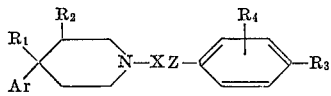

and their non-toxic acid addition salts, wherein X is a member selected from the group consisting of methylene and straight unsubstituted, saturated, and mono-ethylenically unsaturated hydrocarbon chains of three carbon atoms, Z is a member selected from the group consisting of —$CH_2$—, and, when X is saturated,

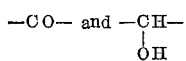

Ar is a member selected from the group consisting of meta-chloro-, meta-bromo-, meta-fluoro-, and meta-trifluoromethyl-phenyl, $R_1$ and $R_2$ when taken separately represent hydrogen atoms and when taken together represent a single bond, $R_3$ is a substituent selected from the group consisting of amino, di(alkyl)amino, monohydroxyalkylamino, nitro, alkanoylamino, carbamoylamino, and alkoxy-carbonylamino, the said alkyl, hydroxyalkyl, alkanoyl and alkoxy groups each having a maximum of four carbon atoms in all, and $R_4$ is a member selected from the group consisting of hydrogen and —$NH_2$.

2. The compound 1-2'-(p-aminophenyl)ethyl-4-m-trifluoromethylphenyl-1,2,3,6-tetrahydropyridine.

3. The compound 1,2'-(p-formamidophenyl)ethyl-4-m-trifluoromethylphenyl-1,2,3,6-tetrahydropyridine.

4. The compound 1,2'-(p-acetamidophenyl)ethyl-4-m-trifluoromethylphenyl-1,2,3,6-tetrahydropyridine.

5. The compound 1-2'-(p-methanesulphonamidophenyl)ethyl-4-m-trifluoromethylphenyl - 1,2,3,6 - tetrahydropyridine.

6. The compound 1-2'-(p-N-2 - hydroxyethylaminophenyl)ethyl-4-m - trifluoromethylphenyl - 1,2,3,6-tetrahydropyridine.

7. The compound DL - 1 - 2' - (p-aminophenyl)-2'-hydroxyethyl-4-m-trifluoromethylphenyl - 1,2,3,6 - tetrahydropyridine.

8. The compound 1-2'-(p-ureidophenyl)ethyl-4-m-trifluoromethylphenyl-1,2,3,6-tetrahydropyridine.

9. The compound 1-2'-(p-N-2-acetoxyethylaminophenyl)ethyl-4-m-fluoromethylphenyl - 1,2,3,6 - tetrahydropyridine.

10. The compound 1-2'-(3-amino-4-acetamidophenyl)ethyl-4-m-trifluoromethylphenyl- - 1,2,3,6-tetrahydropyridine.

11. The compound 1-2'-(p-aminophenyl)ethyl-4-m-trifluoromethylphenylpiperidine.

12. The compound 1-2'-(p-aminophenyl)ethyl-4-m-chlorophenyl-1,2,3,6-tetrahydropyridine.

References Cited by the Examiner

UNITED STATES PATENTS

| 2,973,365 | 2/61 | Janssen | 260—297 |
| 3,080,372 | 3/63 | Janssen | 260—294.7 |

WALTER A. MODANCE, *Primary Examiner.*

IRVING MARCUS, *Examiner.*